US010169201B2

(12) United States Patent
Cook et al.

(10) Patent No.: US 10,169,201 B2
(45) Date of Patent: Jan. 1, 2019

(54) DEBUG MANAGEMENT IN A DISTRIBUTED BATCH DATA PROCESSING ENVIRONMENT

(71) Applicant: International Business Machines Corporation, Armonk, NY (US)

(72) Inventors: Alexander Cook, Rochester, MN (US); Ryan K. Cradick, Oronoco, MN (US); Jason A. Nikolai, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/401,011

(22) Filed: Jan. 7, 2017

(65) Prior Publication Data

US 2018/0196730 A1    Jul. 12, 2018

(51) Int. Cl.
    *G06F 11/00*     (2006.01)
    *G06F 11/36*     (2006.01)
    *G06F 17/30*     (2006.01)
    *G06F 9/48*      (2006.01)

(52) U.S. Cl.
    CPC .......... *G06F 11/366* (2013.01); *G06F 9/4843* (2013.01); *G06F 17/30516* (2013.01)

(58) Field of Classification Search
    CPC .. G06F 11/0709; G06F 11/3006; G06F 11/36; G06F 11/3608; G06F 11/362; G06F 11/366; G06F 11/3664; G06F 11/3668; G06F 11/3672; G06F 17/30516
    See application file for complete search history.

(56) References Cited

U.S. PATENT DOCUMENTS

| 5,167,012 A | * | 11/1992 | Hayes ............... G06F 11/362 706/59 |
| 8,924,940 B2 | | 12/2014 | Branson et al. |
| 2006/0129988 A1 | * | 6/2006 | Calsyn ................ G06F 9/4843 717/124 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Joshua P Lottich
(74) *Attorney, Agent, or Firm* — Michael A. Petrocelli

(57) ABSTRACT

Disclosed aspects relate to debug management in a distributed batch data processing environment which uses a shared pool of configurable computing resources. A debug configuration to fire a breakpoint based on an achievement of a debug criterion may be initiated in the distributed batch data processing environment. A data block may be detected in the distributed batch data processing environment. The data block may be analyzed with respect to the debug criterion by a debug management engine. Achievement of the debug criterion by the data block may be determined by the debug management engine. In response to determining the achievement of the debug criterion by the data block, the breakpoint may be fired based on the achievement of the debug criterion.

19 Claims, 11 Drawing Sheets

(56) References Cited

U.S. PATENT DOCUMENTS

| | | | | |
|---|---|---|---|---|
| 2007/0168994 | A1* | 7/2007 | Barsness | G06F 11/362 717/129 |
| 2011/0154295 | A1* | 6/2011 | Aharoni | G06F 8/74 717/125 |
| 2012/0102460 | A1* | 4/2012 | Bates | G06F 11/362 717/124 |
| 2012/0137178 | A1* | 5/2012 | Barsness | G06F 11/362 714/35 |
| 2012/0185730 | A1 | 7/2012 | Moran et al. | |
| 2012/0266139 | A1* | 10/2012 | Bates | G06F 11/3664 717/125 |
| 2013/0305227 | A1 | 11/2013 | Branson et al. | |
| 2015/0007143 | A1 | 1/2015 | Barsness et al. | |
| 2015/0379083 | A1* | 12/2015 | Lang | G06F 17/30436 707/722 |
| 2016/0092345 | A1* | 3/2016 | Branson | G06F 11/3664 717/129 |
| 2016/0103753 | A1 | 4/2016 | Branson et al. | |
| 2016/0196188 | A1* | 7/2016 | Castellanos | G06F 11/1438 714/19 |
| 2016/0371171 | A1* | 12/2016 | Barsness | G06F 11/362 |
| 2017/0103108 | A1* | 4/2017 | Datta | G06F 17/30516 |

OTHER PUBLICATIONS

Pending U.S. Appl. No. 15/705,330, filed Sep. 15, 2017, entitled "Debug Management in a Distributed Batch Data Processing Environment", pp. 1-69.

IBM: List of IBM Patents or Patent Applications Treated as Related (Appendix P), Sep. 15, 2017, pp. 1-2.

Mell, Peter, et al, The NIST Definition of Cloud Computing, National Institute of Standards and Technology, Oct. 7, 2009, Version 15, NIST, Gaithersburg, MD, US.

Amazon Web Services, Inc.; "Amazon AppStream: Developer Guide"; <http://docs.aws.amazon.com/appstream/latest/developerguide/appstream-test-app-debug.html>.

Eclipsepedia; "FAQ How do I set a conditional breakpoint?"; <https://wiki.eclipse.org/FAQ_How_do_I_set_a_conditional_breakpoint%3F>.

Microsoft; "Managing Exceptions with the Debugger"; <https://msdn.microsoft.com/en-us/library/d14azbfh.aspx>.

Ostrowski, Radek; "Introduction to Apache Spark with Examples and Use Cases"; Toptal, LLC; <https://www.toptal.com/spark/introduction-to-apache-spark>.

\* cited by examiner

DEBUG MANAGEMENT IN A DISTRIBUTED BATCH DATA PROCESSING ENVIRONMENT

BACKGROUND

This disclosure relates generally to computer systems and, more particularly, relates to debug management in a distributed batch data processing environment which uses a shared pool of configurable computing resources. The amount of data that needs to be managed by enterprises is increasing. Debug management may be desired to be performed as efficiently as possible. As data needing to be managed increases, the need for debug management efficiency may increase.

SUMMARY

Aspects of the disclosure relate to debug management in a distributed batch data processing environment which uses a shared pool of configurable computing resources. Aspects of the disclosure relate to debugging data blocks of streaming data using breakpoints. A breakpoint may be established with respect to a data block. The data block may include a Resilient Distributed Dataset (RDD) or a portion of an RDD. The data block may be analyzed to determine if the breakpoint should be fired. For instance, invalid values or values greater than a threshold value may serve as indicators that a breakpoint should be fired. In embodiments, the breakpoint may be fired on one or more distributed partitions of an RDD. Customized analysis may be performed on data blocks based on the nature of the data in the data block.

Disclosed aspects relate to debug management in a distributed batch data processing environment which uses a shared pool of configurable computing resources. A debug configuration to fire a breakpoint based on an achievement of a debug criterion may be initiated in the distributed batch data processing environment. A data block may be detected in the distributed batch data processing environment. The data block may be analyzed with respect to the debug criterion by a debug management engine. Achievement of the debug criterion by the data block may be determined by the debug management engine. In response to determining the achievement of the debug criterion by the data block, the breakpoint may be fired based on the achievement of the debug criterion.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
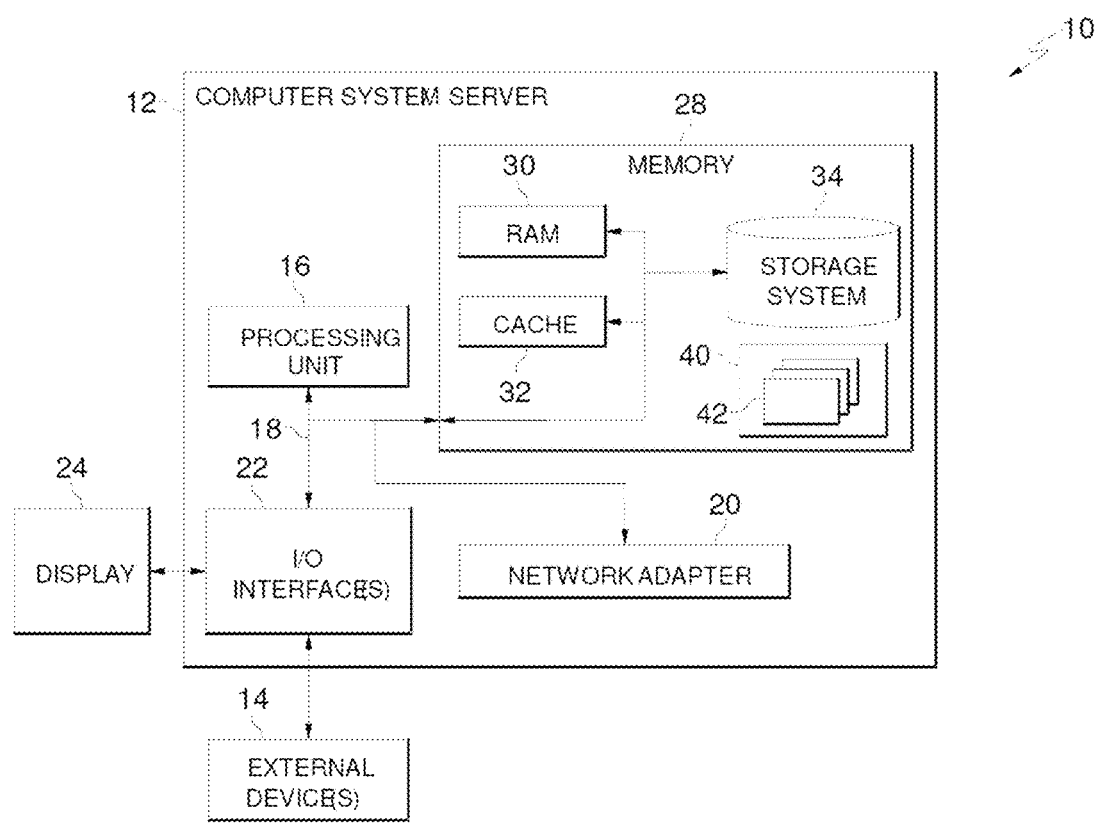
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to debug management in a distributed batch data processing environment which uses a shared pool of configurable computing resources. Aspects of the disclosure relate to debugging data blocks of streaming data using breakpoints. A breakpoint may be established with respect to a data block. The data block may include a Resilient Distributed Dataset (RDD) or a portion of an RDD. The data block may be analyzed to determine if the breakpoint should be fired (e.g., in response to an error event or irregularity). For instance, invalid values or values greater than a threshold value may serve as indicators that a breakpoint should be fired. In embodiments, the breakpoint may be fired on one or more distributed partitions of an RDD (e.g., simultaneously or in a temporally-disparate fashion). Customized analysis may be performed on data blocks based on the nature of the data in the data block. Leveraging breakpoints with respect to debug management in a distributed batch data processing environment may be associated with bug identification, error resolution, debug efficiency, and application performance.

In some distributed computing environments, data is processed in discrete blocks. Data blocks may be sent from one executable to another within the distributed batch data processing environment to undergo processing operations. In some cases, data blocks may be divided into several separate partitions so that the data may be processed by multiple compute nodes simultaneously. Aspects of the disclosure relate to the recognition that, in some situations, debugging data blocks may be associated with challenges, as it may not be known which partitions of a data block encountered errors, as well as when, where, and why the errors occurred. Accordingly, aspects of the disclosure relate to utilizing breakpoints with respect to data blocks of streaming data in order to ascertain information related to which data blocks encountered errors, where and when the errors were encountered, and how they may be resolved to facilitate debug management in the distributed batch data processing environment. In this way, error events with respect to data blocks may be identified and resolved to positively impact data processing efficiency.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for debug management in a distributed batch data processing environment which uses a shared pool of configurable computing resources. A debug configuration may be initiated in the distributed batch data processing environment to fire a breakpoint based on an achievement of a debug criterion. A data block may be detected in the distributed batch data processing environment. The data block may be analyzed by a debug management engine with respect to the debug criterion. Achievement of the debug criterion by the data block may be determined by the debug management engine. In response to determining the achievement of the debug criterion by the data block, the breakpoint may be fired based on the achievement of the debug criterion.

In embodiments, the distributed batch data processing environment may include an Apache Spark (trademark of The Apache Software Foundation) environment. In embodiments, the data block may include a Resilient Distributed Dataset (RDD). The data block may include a partition of an RDD. In embodiments, the breakpoint may be fired with respect to a plurality of data block partitions. In embodiments, one or more breakpoint response actions may be carried-out in a simultaneous fashion with respect to the plurality of data block partitions. In embodiments, one or more breakpoint response actions may be carried-out in a temporally-disparate fashion with respect to the plurality of data block partitions. Altogether, performance or efficiency benefits with respect to debug management in a distributed batch data processing environment may occur (e.g., speed, flexibility, load balancing, responsiveness, high availability, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
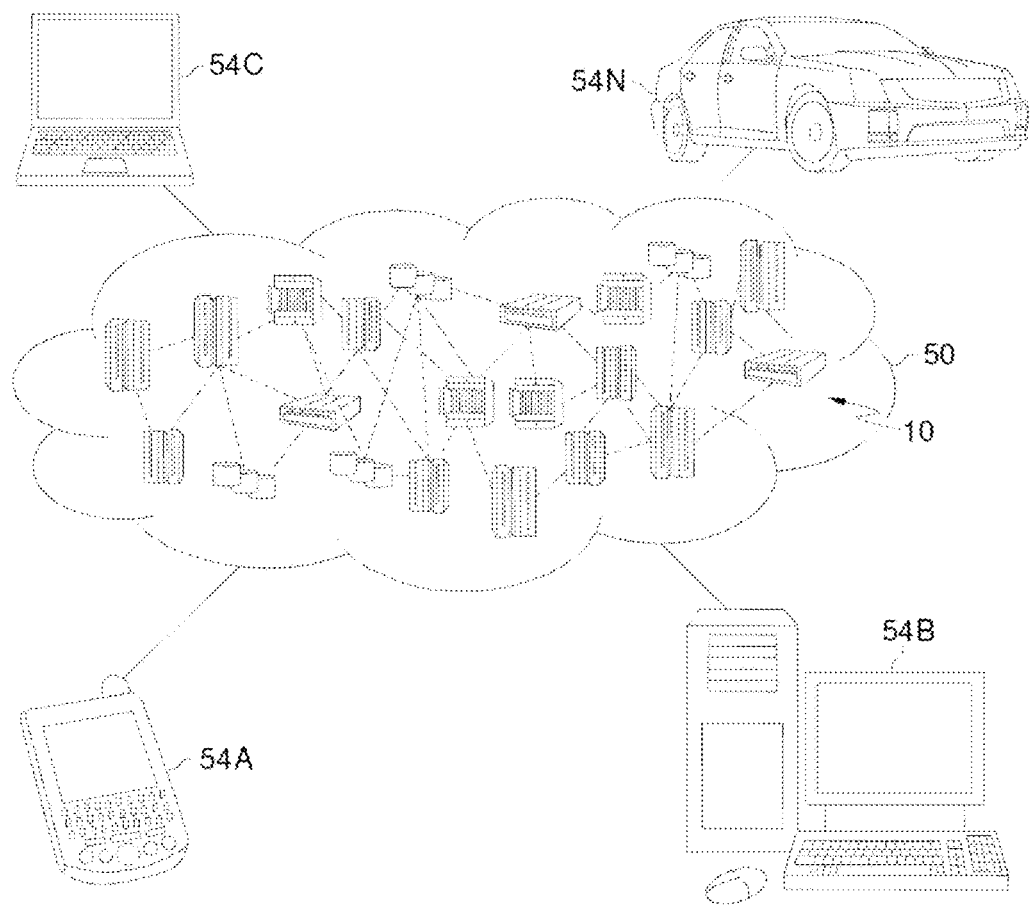
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
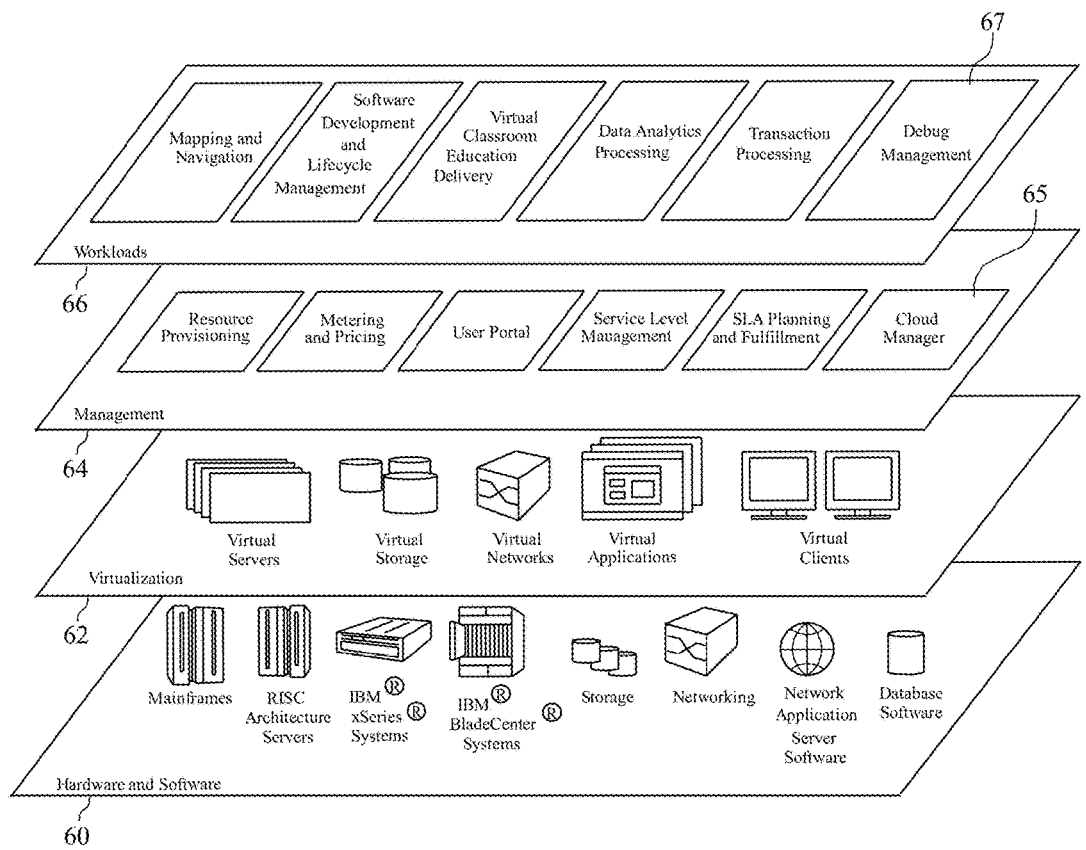
FIG. 3 depicts abstraction model layers according to embodiments.

Referring now to FIG. 3, a set of functional abstraction layers provided by cloud computing environment 50 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 60 includes hardware and software components. Examples of hardware components include mainframes, in one example IBM System z systems; RISC (Reduced Instruction Set Computer) architecture based servers, in one example IBM Power Systems; IBM System x systems; IBM BladeCenter systems; storage devices; networks and networking components. Examples of software components include network application server software, in one example IBM Web Sphere® application server software; database software, in one example IBM DB2® database software; and streaming software, in one example IBM InfoSphere® Streams stream computing software. IBM, System z, Power Systems, System x, BladeCenter, InfoSphere, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 65 is representative of a cloud manager (or shared pool manager) as described in more detail below. While the cloud manager 65 is shown in FIG. 3 to reside in the management layer 64, cloud manager 65 can span all of the levels shown in FIG. 3, as discussed below.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and debug management 67, which may be utilized as discussed in more detail below.

Figure 4:
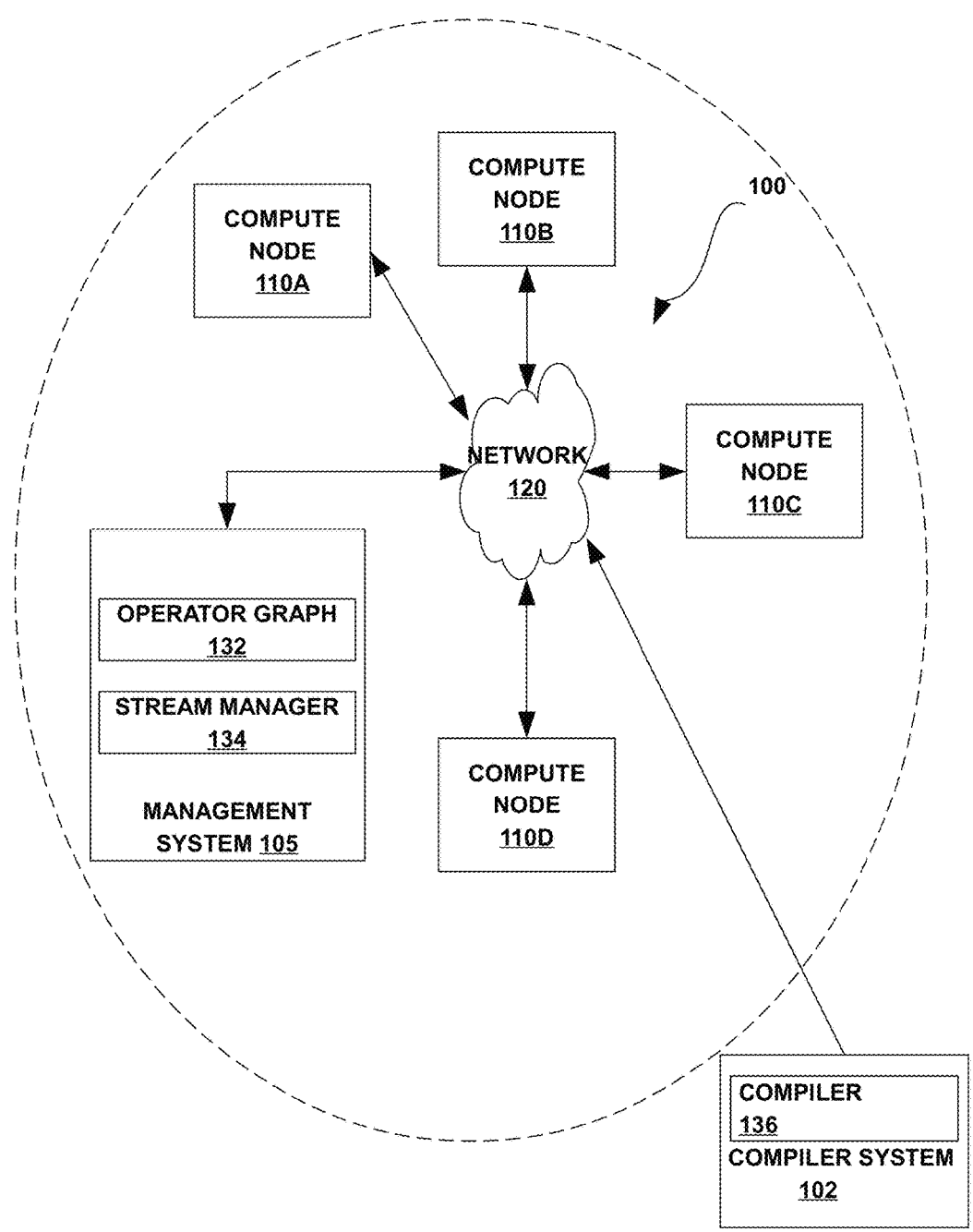
FIG. 4 illustrates an exemplary computing infrastructure to execute a stream computing application according to embodiments.

FIG. 4 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 5:
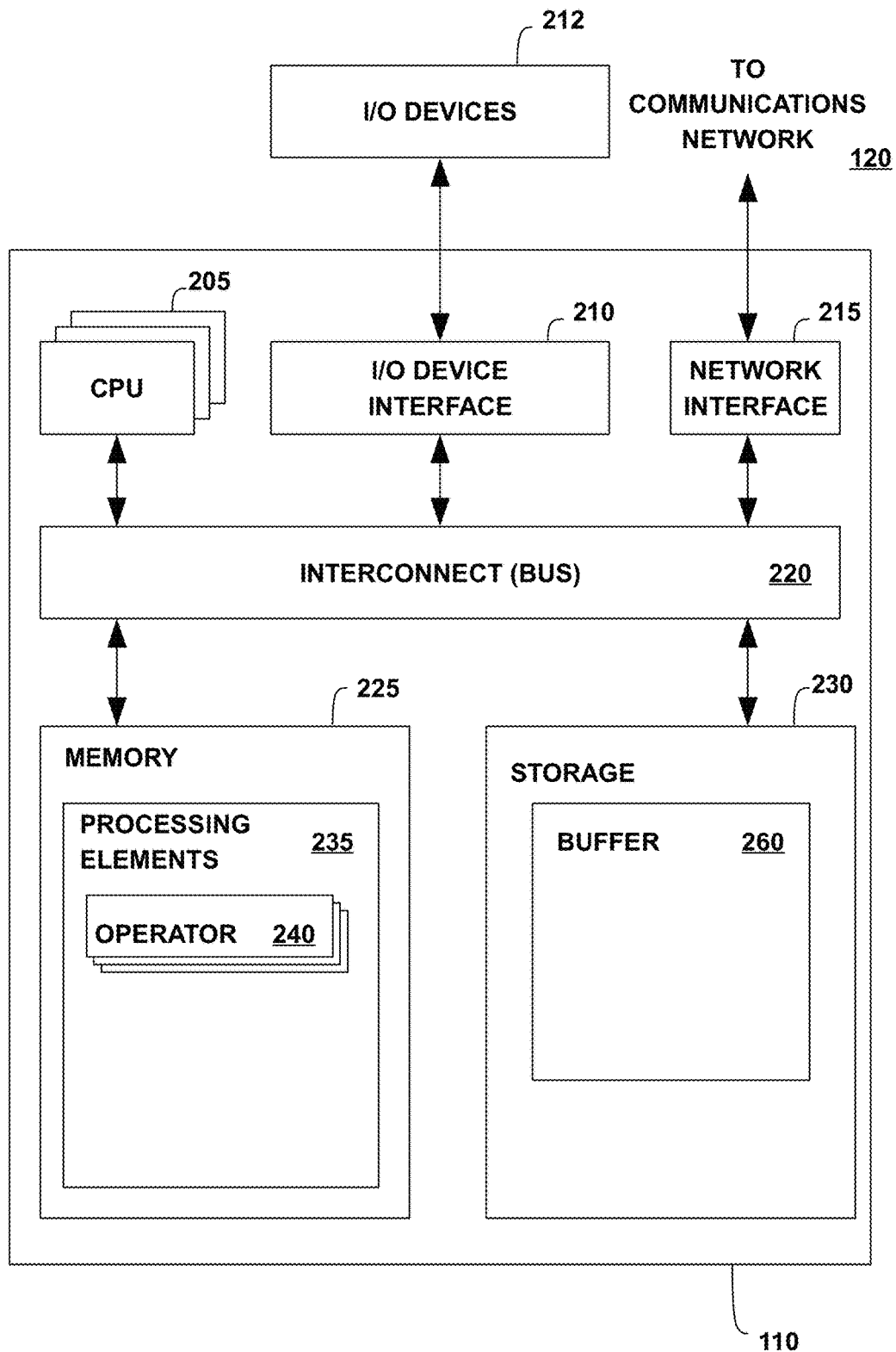
FIG. 5 illustrates a view of a compute node according to embodiments.

FIG. 5 is a more detailed view of a compute node 110, which may be the same as one of the compute nodes 110A-110D of FIG. 4, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems. An operating system may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 6:
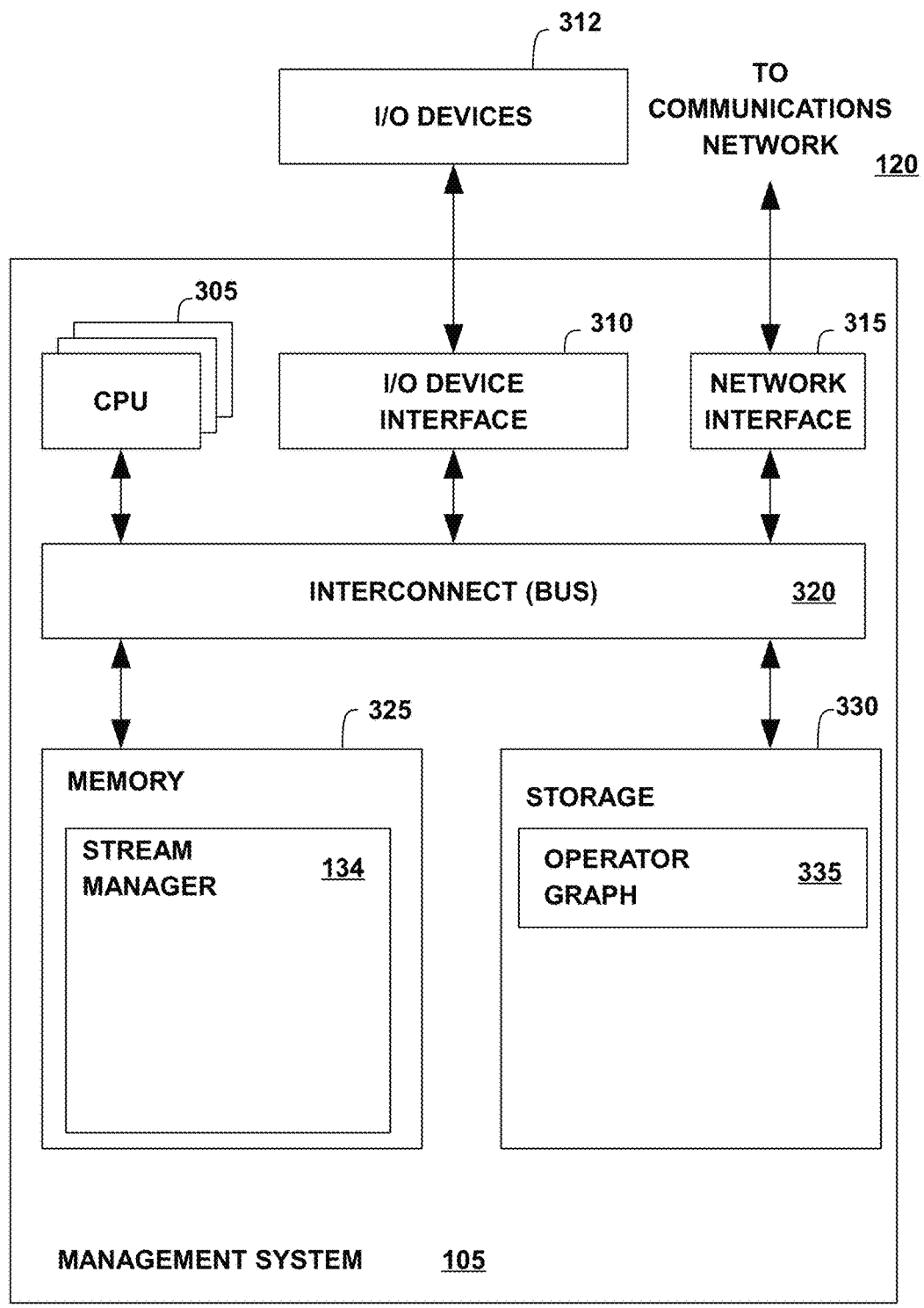
FIG. 6 illustrates a view of a management system according to embodiments.

FIG. 6 is a more detailed view of the management system 105 of FIG. 4 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 5) for processing or stored in memory 325 (e.g., completely in embodiments, partially in embodiments).

The management system 105 may include one or more operating systems. An operating system may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 7:
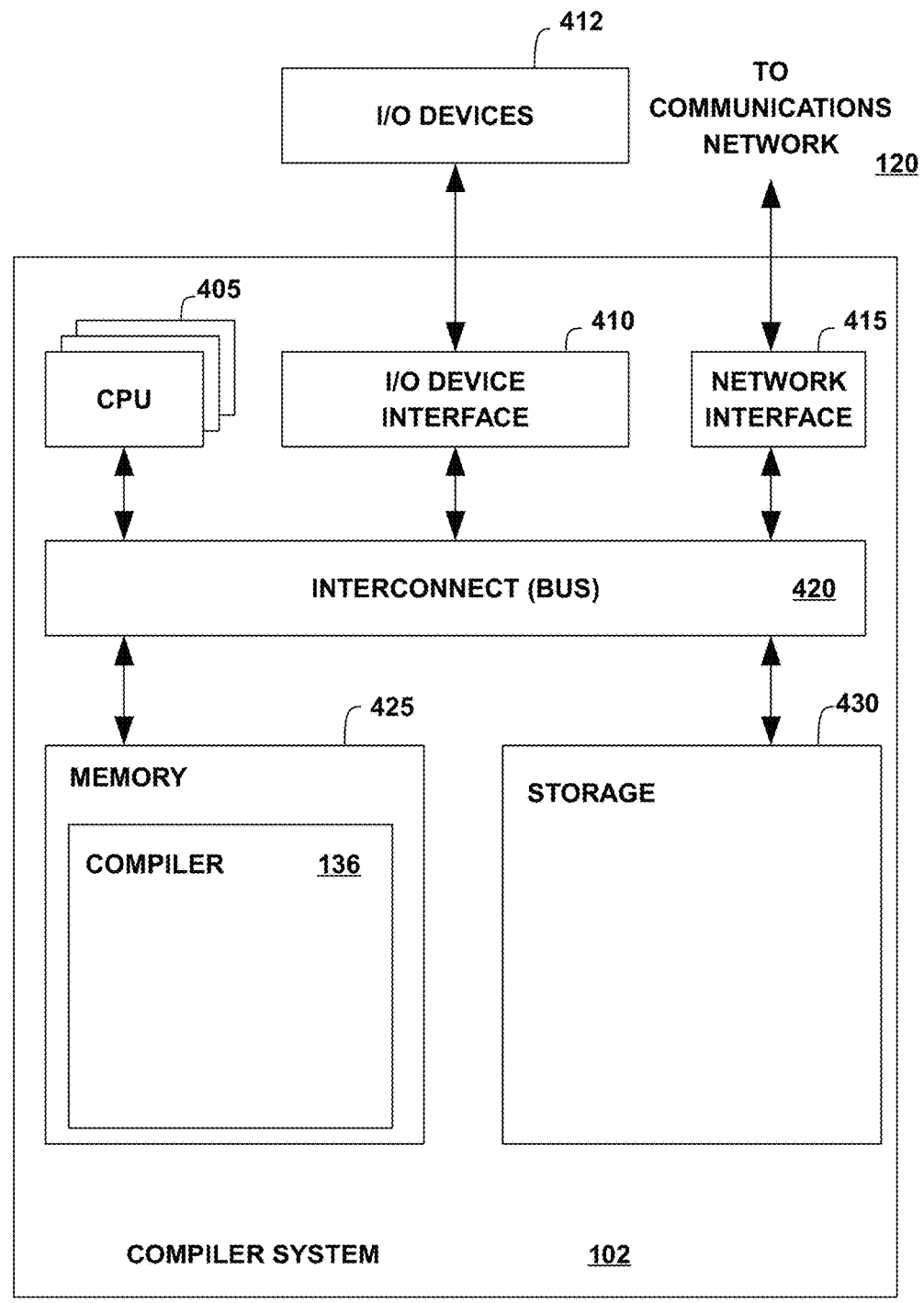
FIG. 7 illustrates a view of a compiler system according to embodiments.

FIG. 7 is a more detailed view of the compiler system 102 of FIG. 4 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems. An operating system may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph (e.g., the operator graph 335 of FIG. 6).

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 8:
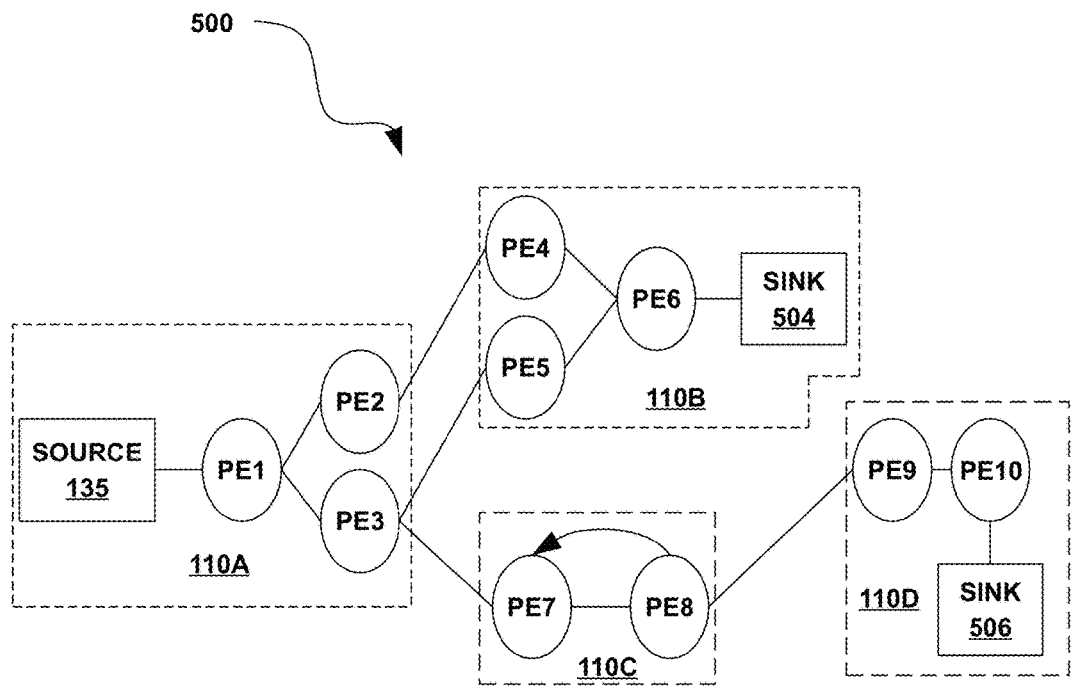
FIG. 8 illustrates an exemplary operator graph for a stream computing application according to embodiments.

FIG. 8 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 8 is abstracted to show connected processing elements PE1-PE10, the operator graph 500 may include data flows between stream operators 240 (FIG. 5) within the same or different processing elements. Typically, processing elements, such as processing element 235 (FIG. 5), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 8 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 5) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 4 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 8 illustrates execution paths between processing elements for the sake of clarity.

Figure 9:
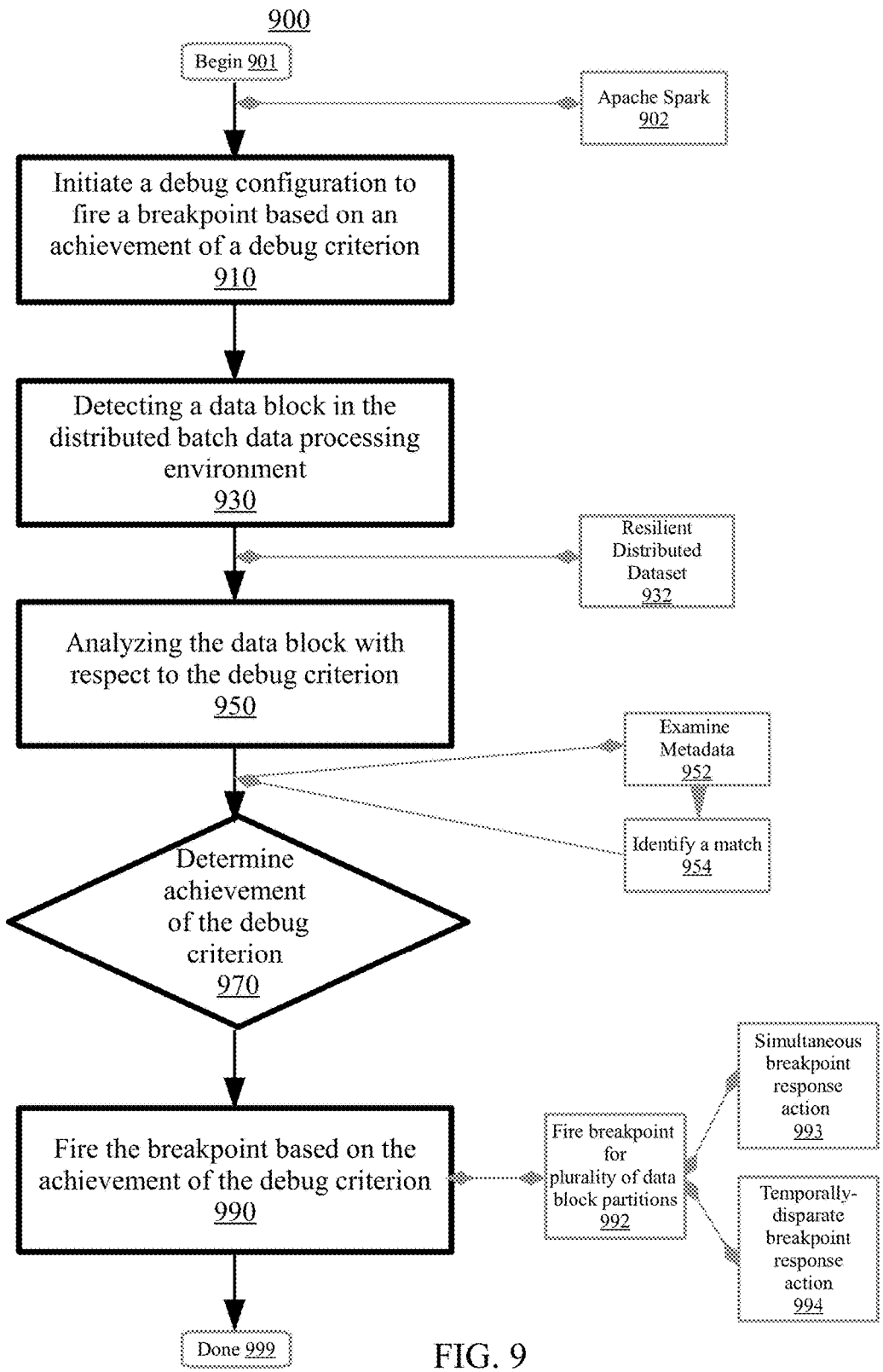
FIG. 9 is a flowchart illustrating a method for debug management in a distributed data batch processing environment, according to embodiments.

FIG. 9 is a flowchart illustrating a method 900 for debug management in a distributed data batch processing environment, according to embodiments. Aspects of FIG. 9 relate to firing a breakpoint based on a determination that a data block achieves a debug criterion. Aspects of the disclosure relate to the recognition that, in some distributed data batch processing environments, debugging streaming data may be associated with challenges as it may not be known which portions of streaming data encountered errors, as well as when, where, and why the errors occurred. Accordingly, aspects of the disclosure relate to utilizing breakpoints with respect to data blocks of streaming data in order to ascertain information related to which data blocks encountered errors, where and when the errors were encountered, and how they may be resolved to facilitate debug management in the distributed batch data processing environment. Altogether, leveraging breakpoints with respect to debug management in a distributed batch data processing environment may be associated with bug identification, error resolution, debug efficiency, and application performance. The method 900 may begin at block 901.

At block 910, a debug configuration may be initiated in the distributed batch data processing environment. The debug configuration may be initiated to fire a breakpoint based on an achievement of a debug criterion. Generally, initiating can include starting, introducing, launching, instantiating, commencing, or otherwise beginning the debug configuration in the distributed batch data processing environment. The debug configuration may include a menu, mode, or other interface configured to provide access to tools and functions for debugging data (e.g., data blocks) or applications. As examples, the debug configuration may provide tools for collecting and analyzing data (e.g., bug/error data), feature testing, execution monitoring, parameter value modification, or the like. In embodiments, the debug configuration may be configured to provide tools for managing breakpoints. Breakpoints may include intentional stopping or pause locations in a program that are configured to halt operation of an application or program once triggered. As an example, the breakpoint may include a watchpoint (e.g., type of breakpoint configured to stop execution of an application when the value of a specified expression achieves a particular value). In embodiments, the breakpoint may be associated with one or more debug criteria. The debug criteria may include benchmarks, principles, rules, or guidelines that define the situations, thresholds, parameters configurations, or other conditions that trigger firing of a breakpoint. As examples, the debug criteria may define upper or lower thresholds for parameter values, valid data value types, readable file formats, or the like. In the event that a debug criteria is achieved, the debug configuration may be configured to trigger firing of the breakpoint. In embodiments, initiating the debug configuration may include launching a data batch diagnostic tool to monitor the data in the distributed batch data processing environment with respect to the debug criterion. Other methods of initiating the debug configuration in the distributed batch data processing environment are also possible.

In embodiments, the distributed batch data processing environment may include an Apache Spark environment (or the like) at block 902. The Apache Spark environment may include a cluster computing framework for providing an interface for programming clusters of computer nodes with implicit data parallelism and fault-tolerance. In embodiments, the Apache Spark environment may provide an application programming interface (API) configured to manage data structures including resilient distributed datasets (RDDs). The Apache Spark environment may be configured to process data from a variety of data repositories, including the Hadoop Distributed File System (HDFS) (Hadoop is a trademark of The Apache Software Foundation), NoSQL databases, and relational data stores. In-memory processing may be used to support performance of big data analytics applications. In embodiments, the Apache Spark environment may include a core API for distributed task dispatching, scheduling, and I/O functionality, a machine learning library including a plurality of machine learning and statistical analysis algorithms (e.g., summary statistics, support vector machines, collaborative filtering, cluster analysis methods, transformation functions, optimization algorithms), a graph processing framework, and stream computing functionality for performance of streaming analytics. In embodiments, the Apache Spark environment may be configured to be used in conjunction with one or more other distributed batch data processing environments (e.g., Hadoop, Storm (trademark of The Apache Software Foundation), Kafka (trademark of The Apache Software Foundation), Flume (trademark of The Apache Software Foundation), ZeroMQ (trademark of iMatix Corporation)). As described herein, the Apache Spark environment may be used to manage (e.g., establish, monitor, fire) breakpoints with respect to data blocks to facilitate debug management. Other types of distributed batch data processing environment are also possible.

At block 930, a data block may be detected in the distributed batch data processing environment. Generally, detecting can include sensing, recognizing, discovering, ascertaining, or otherwise identifying the presence of the data block in the distributed batch data processing environment. The data block may include a set, batch, bundle, package, portion, or other grouping of data or information. As an example, in certain embodiments, the data block may contain information related to market transactions on a stock exchange. In embodiments, the data block may correspond to a specific number of bytes of physical storage space (e.g., in a database, on a disk) or have a fixed size. In embodiments, as described herein, the data blocks may be used to format and organize data for analysis and transmission within the distributed batch data processing environment. For instance, in certain situations, a data block may be broken into several partitions, and one or more of the partitions may be transmitted from one executable (e.g., node, processing element, stream operator) to another to undergo processing operations within the distributed batch data processing environment. In embodiments, detecting the data block may include utilizing a streams management engine to scan the distributed batch data processing environment and identify one or more data blocks. Detecting may include ascertaining that a data block is in transit (e.g., in between computing nodes) or undergoing processing (e.g., receiving an operation by a computing node, processing element, or operator). Other methods of detecting the data block in the distributed batch data processing environment are also possible.

In embodiments, the data block may include a Resilient Distributed Dataset (RDD) at block 932. The RDD may include a read-only multiset of data items distributed over a cluster of machines within the distributed batch data processing environment. The RDD may be maintained in a fault-tolerant way, such that a failure with respect to the RDD does not compromise the operation or functionality of components of the distributed batch data processing environment. The RDD may be structured by loading an external dataset or distributing a collection from a driver program. In embodiments, the RDD may be configured for transformation operations (e.g., map, filter, join, union) in which a process or procedure is performed on the RDD to create a new RDD including the result of the transformation operation. In embodiments, the RDD may be configured for action operations (e.g., reduce, count, first) in which a value is returned after a computation is performed on an RDD. In embodiments, aspects of the disclosure relate to a data block that includes a partition of a RDD. As described herein, aspects of the disclosure relate to the recognition that in some situations, an RDD may be divided into one or more partitions and transmitted to separate compute nodes to undergo processing operations. Accordingly, in embodiments, the RDD may include a distributed collection of partitions having a set of data objects that can be operated on in parallel (e.g., configured to be opened and processed by multiple compute nodes of the distributed batch data processing environment simultaneously). Other types of data blocks and methods of structuring the RDD are also possible.

At block 950, the data block may be analyzed by a debug management engine. The data block may be analyzed with respect to the debug criterion. Generally, analyzing can include determining information regarding the characteristics or properties of the data block (e.g., contents, parameters, configuration settings). Analyzing can include examining (e.g., performing an inspection of the data block), evaluating (e.g., generating an appraisal of the data block), resolving (e.g., ascertaining an observation/conclusion/answer with respect to the data block), parsing (e.g., deciphering structured and unstructured data constructs of the data block), querying (e.g., asking a question regarding the data block), or categorizing (e.g., organizing by a feature or type of the data block). In embodiments, analyzing may include examining the data block to extract properties or attributes that characterize the relationship between the data block and the debug criterion. For instance, in certain embodiments, analyzing may include using a static code analysis tool to evaluate whether the data block achieves a debug criterion of a set of debug criteria. As described herein, the data block may be analyzed by a debug management engine. The debug management engine may include a physical or logical computing module configured to evaluate the data block with respect to the set of debug criteria and facilitate performance of debugging operations. In embodiments, the debug management engine may include a locally-maintained computing module configured to run on one or more compute nodes of the distributed batch data processing environment. In embodiments, the debug management engine may be a remotely-located computing module maintained on a remote server or compute node accessible to the distributed batch data processing environment (e.g., via a subscription-based service or the like). In embodiments, analyzing may include utilizing the debug management engine to examine the data block while the data block is undergoing processing operations at a particular compute node of the distributed batch data processing environment. In embodiments, analyzing may include continuously or periodically monitoring the data block as it is routed through the distributed batch data processing environment. Other methods of analyzing the data block with respect to the debug criterion are also possible.

In embodiments, a set of metadata of the data block may be examined at block 952. The set of metadata may be examined to analyze the data block with respect to the debug criterion. Generally, examining can include investigating, evaluating, scrutinizing, or otherwise assessing the set of metadata of the data block. The set of metadata may include information that describes, defines, represents, or otherwise characterizes the data block. For instance, the set of metadata may include information regarding the formatting of the data in the data block, the types of values, magnitude ranges of included values, or the like. As an example, a set of metadata may indicate that a particular data block includes information related to "The Periodic Table of the Elements," and more specifically, includes information about elements with an atomic mass under 21 AMU. In embodiments, examining can include extracting the set of metadata of the data block, and structuring (e.g., formatting, normalizing) it for comparison with the set of debug criteria. For instance, with reference to the previous example, examining may include extracting the metadata related to the atomic mass range of the included elements, and formatting it as "AMU Range: 0-21" to facilitate comparison with the set of debug criteria. Other methods of examining the set of metadata of the data block are also possible.

In embodiments, a match to determine achievement of the debug criterion by the data block may be identified at block 954. The match may be identified by comparing the debug criterion with the set of metadata of the data block. Generally, identifying can include detecting, sensing, recognizing, discovering, ascertaining, or otherwise determining the match. In embodiments, the match may include a correlation, correspondence, similarity above a threshold, congruence, equivalence, or logical symmetry between the metadata of the data block and a debug criterion of the set of debug criteria. As described herein, identifying the match may include comparing (e.g., contrasting, assessing in parallel, juxtaposing) the debug criterion with the set of metadata of the data block. For instance, the set of metadata extracted from the data block may be examined with respect to a set of debug criteria, and it may be ascertained that the metadata of the data block fulfills, satisfies, meets, or otherwise achieves one or more debug criteria of the set of debug criteria. As an example, consider a debug criterion that defines a "number of data objects greater than 7." Accordingly, a set of metadata indicating that a data block includes information about elements with an atomic mass less than 21 AMU may be compared with the debug criterion, and it may be ascertained that, as there are at least 10 elements with an atomic mass less than 21 AMU, the data block achieves the debug criterion. As such, a match may be identified between the data block and the debug criterion. Other methods of identifying a match by comparing the debug criterion with the set of metadata of the data block are also possible.

At block 970, achievement of the debug criterion by the data block may be determined. Achievement of the debug criterion by the data block may be determined by the debug management engine. Aspects of the disclosure relate to the recognition that, in some situations, data blocks may be associated with characteristics indicative of bugs, errors, or irregularities. Accordingly, aspects of the disclosure relate to determining that a data block achieves a debug criterion in order to facilitate debugging with respect to the data block. Generally, determining can include computing, formulating, resolving, deriving, calculating, identifying, or otherwise ascertaining achievement of the debug criterion by the data block. In embodiments, determining may include identifying that one or more debug criteria of the set of debug criteria is fulfilled, satisfied, met, or otherwise achieved by the data block. Determining may include utilizing the debug management engine to evaluate the data block with respect to the set of debug criteria, and ascertaining that the data block includes a quality, property, characteristic, or other attribute that achieves at least one debug criterion of the set of debug criteria. For instance, the attribute of the data block may represent an unsupported parameter type, an invalid value range, an incorrect syntax, or other irregularity that may adversely impact data processing or application performance in the distributed batch data processing environment. As an example, a particular data block may include a date value of "Feb. 29, 2019." Accordingly, the debug management engine may examine the date value with respect to a debug criterion that relates to "Invalid Date Specification," and ascertain that the specified date is invalid (e.g., 2019 is not a leap year, and so there is no 29th day in February). As such, the debug management engine may determine that the data block achieves the debug criterion. Other methods of determining achievement of the debug criterion by the data block are also possible.

At block 990, a breakpoint may be fired based on the achievement of the debug criterion. The breakpoint may be fired in response to determining the achievement of the debug criterion by the data block. Generally, firing can include prompting, triggering, provoking, achieving, initiating, or otherwise activating the breakpoint based on the achievement of the debug criterion. As described herein, the breakpoint may be configured to stop, pause, or otherwise freeze execution of an application or other program code when triggered. Accordingly, in embodiments, firing the breakpoint may include halting execution of code included in the data block, or ceasing performance of one or more operations with respect to the data block in response to determining that the data block achieves one or more debug criteria. In certain embodiments, firing the breakpoint may include freezing execution of all operations with respect to the data block, and marking the data block with a metadata tag that includes information regarding where the breakpoint was fired (e.g., code location where the debug criterion was achieved, area in the distributed batch data processing environment where the data block was when the breakpoint was fired), the nature of the debug criterion that was achieved (e.g., invalid parameter value type), and suggested response actions that may be taken to debug the data object. As an example, in certain embodiments, firing the breakpoint may include halting execution of program code included in the data block, and generating a metadata tag that indicates that the debug criterion related to an invalid syntax form, was achieved at a code location of Line 113, and that the breakpoint was fired when the data block was being processed by a Compute Node B of the distributed batch data processing environment. Other methods of firing the breakpoint based on the achievement of the debug criterion are also possible.

In embodiments, the breakpoint may be fired with respect to a plurality of data block partitions at block 992. Aspects of the disclosure relate to the recognition that, in some situations, data blocks (e.g., such as RDDs) may be distributed over multiple compute nodes within the distributed batch data processing environment, such that partitions of the same RDD, or RDDs having similar configurations may simultaneously be in process at different points in the distributed batch data processing environment. Accordingly, aspects of the disclosure relate to firing a breakpoint with respect to a plurality of data block partitions. Generally, firing can include prompting, triggering, provoking, achieving, initiating, or otherwise activating the breakpoint with respect to a plurality of data block partitions. In embodiments, firing the breakpoint may include halting execution of operations or processes with respect to multiple data blocks in response to detecting achievement of the debug criterion. For instance, in response to determining achievement of the debug criterion with respect to a first data block, execution of operations may be halted on a plurality of other data blocks that are linked, coupled, or otherwise associated with the first data block (e.g., data blocks that may have logical/structural similarities with the first data block). Consider the following example. A distributed batch data processing environment may include a set of data blocks having a first data block, a second data block, and a third data block. The first, second, and third data blocks may include portions of similar programming code, and be logically linked with one another (e.g., as indicated by a logical topology graph maintained by a debug management engine). Each block of the set of data blocks may be distributed to a different compute node of the distributed batch data processing environment for independent processing. The first data block may be analyzed with respect to a set of debug criteria, and it may be determined that the first data block achieves a debug criterion related to "command syntax." Accordingly, as described herein, a breakpoint may be fired with respect to the first data block, the second data block, and the third data block to halt execution of a plurality of operations with respect to the set of data blocks. Other methods of firing the breakpoint with respect to a plurality of data block partitions are also possible.

In embodiments, one or more breakpoint response actions may be carried-out in a simultaneous fashion with respect to the plurality of data block partitions at block 993. Generally, carrying-out can include implementing, enacting, instantiating, executing, or otherwise performing one or more breakpoint response actions in a simultaneous fashion. The breakpoint response actions may include one or more processes, procedures, or other operations taken to resolve, mitigate, or manage the achievement of the debug criterion. In embodiments, carrying-out the breakpoint response actions in a simultaneous fashion may include configuring the debug management engine to coordinate concurrent firing of the breakpoint with respect to a plurality of data block partitions. In this way, execution of multiple processes with respect to the plurality of data block partitions may be halted at the same time. In embodiments, one or more breakpoint response actions may be carried-out (e.g., implemented, enacted, instantiated, executed, performed) in a temporally-disparate fashion with respect to the plurality of data block partitions at block 994. In embodiments, carrying-out the breakpoint response actions in a temporally-disparate fashion may include performing one or more breakpoint response actions at separate times with respect to one another. In embodiments, carrying-out may include staggering performance of a series of breakpoint response actions based on a specified temporal period (e.g., wait 10 minutes in between execution of each breakpoint response action). In embodiments, carrying-out may include implementing a breakpoint response action in response to processing one or more data blocks to a predefined point of execution (e.g., the point where debugging becomes necessary with respect to the data block). As an example, consider a situation in which a first data block, a second data block, and a third data block are allocated to different compute nodes within the distributed batch data processing environment. It may be determined that each of the first, second, and third data blocks achieve a debug criterion at code line 262. Accordingly, in certain embodiments, the first, second, and third data blocks may be independently processed up until code line 262 is reached (e.g., the time to process each data block to the specified code line may vary based on the configuration of the host compute node and other factors, such that each data block may reach the specified code line at different times), at which point a breakpoint response action to halt operation of processes with respect to the data block may be performed. Other methods of carrying-out the breakpoint response actions are also possible.

Consider the following example. A distributed batch data processing environment may include a financial transaction processing application. Compute nodes of the distributed batch data processing environment may be configured to process data blocks that include information about financial transactions between individuals, corporate entities, and other organizations. As described herein, a debug configuration to fire a breakpoint based on an achievement of a debug criterion may be initiated in the distributed batch data processing environment. In embodiments, the debug criterion may include a range threshold with respect to the routing number of a financial transaction, such that data blocks pertaining to transactions with routing numbers greater than 9 digits are considered to be invalid (e.g., routing numbers may have been formatted incorrectly, indicating a software error). As described herein, a data block related to a financial transaction may be detected in the distributed batch data processing environment. The data block may be analyzed with respect to the debug criterion. For instance, metadata for the data block may be compared with the debug criterion in order to ascertain whether the debug criterion is fulfilled, met, or otherwise achieved by the data block. In certain embodiments, it may be determined that the routing number specified by the data block is 11 digits long, exceeding the 9-digit range specified by the debug criterion. Accordingly, it may be determined that the data block achieves the debug criterion, and a breakpoint may be fired with respect to the data block to halt execution of further processing operations. In certain embodiments, a breakpoint response action may be performed to debug the data block (e.g., reformat the routing number). Other methods of debug management in a distributed batch data processing environment are also possible.

Method 900 concludes at block 999. Aspects of method 900 may provide performance or efficiency benefits related to debug management in a distributed batch data processing environment. As an example, breakpoints may be fired with respect to data blocks in a distributed batch data processing environment to identify data blocks associated with bugs, errors, or other irregularities at the point where they encounter a problem. In this way, breakpoint response actions such as debugging operations, temporary execution freezes, or other actions may be taken to facilitate error resolution. Altogether, leveraging breakpoints with respect to debug management in a distributed batch data processing environment may be associated with bug identification, error resolution, debug efficiency, and application performance.

Figure 10:
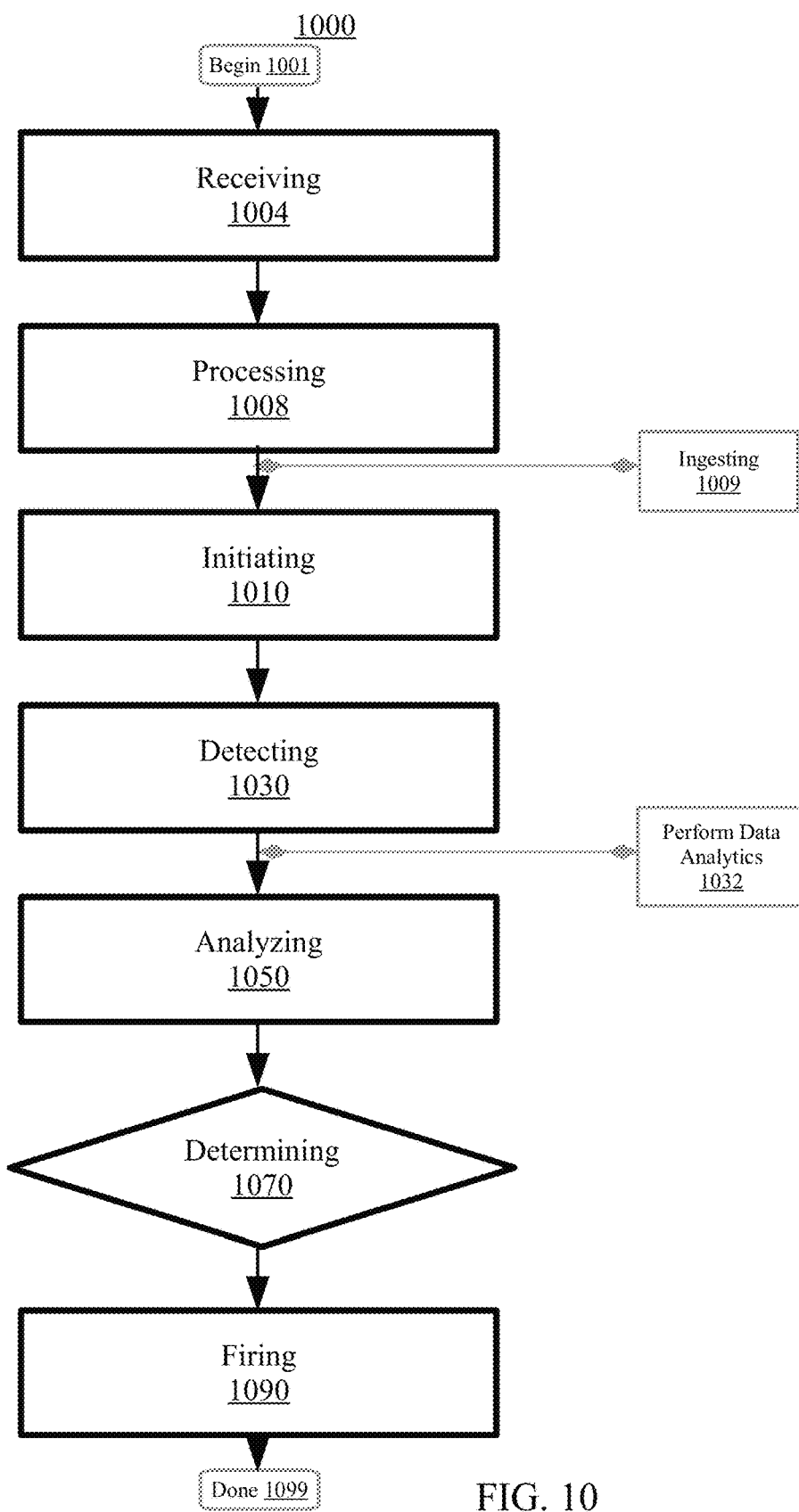
FIG. 10 is a flowchart illustrating a method for debug management in a distributed batch data processing environment, according to embodiments.

FIG. 10 is a flowchart illustrating a method 1000 for debug management in a distributed batch data processing environment, according to embodiments. Aspects of the method 1000 relate to receiving and processing a stream of tuples. The method 1000 may begin at block 1001. At block 1004, the stream of tuples may be received. The stream of tuples may be processed by a plurality of processing elements (e.g., stream operators) operating on a set of compute nodes (e.g., in a stream application environment). The stream of tuples may be received consistent with the description herein including FIGS. 1-11. Current/future processing by the plurality of processing elements may be performed consistent with the description herein including FIGS. 1-11. The set of compute nodes may include a shared pool of configurable computing resources. For example, the set of compute nodes can be a public cloud environment, a private cloud environment, a distributed batch data processing environment, or a hybrid cloud environment. In certain embodiments, each of the set of compute nodes are physically separate from one another.

At block 1008, the stream of tuples may be processed. The stream of tuples may be processed by the plurality of processing elements operating on the set of compute nodes. The stream of tuples may be processed consistent with the description herein including FIGS. 1-11. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, the stream of tuples may be ingested by the distributed batch data processing environment at block 1009. The stream of tuples may be ingested by the distributed batch data processing environment in response to both receiving and processing the stream of tuples by the stream computing environment. Aspects of the disclosure relate to the recognition that, in some embodiments, the distributed batch data processing environment may be configured for utilization in conjunction with stream computing environments or one or more other data processing environments. Accordingly, in certain embodiments, aspects of the disclosure relate to using a stream computing environment to perform initial operations on a stream of tuples, and subsequently using a distributed batch data processing environment to ingest the stream of tuples for subsequent processing operations. Generally, ingesting can include receiving, importing, collecting, analyzing, transforming, processing, monitoring, or capturing the stream of tuples. In embodiments, ingesting the stream of tuples may include using a data import feature of the distributed batch data processing environment to import the stream of tuples from the stream computing environment, and format them (e.g., batch them into data blocks) for processing in the distributed batch data environment. Consider the following example. A stream of tuples may be received and processed by a series of processing elements of a stream computing environment. Subsequent to processing by the stream computing environment, the stream of tuples may flow to a sink operator for temporary storage. Accordingly, the distributed batch data processing environment may be configured to extract the stream of tuples from the sink operator, and group them together into a data block format for subsequent processing in the distributed batch data processing environment. Other methods of ingesting the stream of tuples by the distributed data batch environment are also possible. At block 1010, a debug configuration to fire a breakpoint based on an achievement of a debug criterion may be initiated in the distributed batch data processing environment. At block 1030, a data block may be detected in the distributed batch data processing environment.

In embodiments, a set of data analytics may be performed on the data block at block 1032. The set of data analytics may be performed on the data block in advance of firing the breakpoint. Aspects of the disclosure relate to the recognition that, in some embodiments, the distributed batch data processing environment may be configured to perform one or more data analytics operations on the data block to draw conclusions or form deductions about the data block. Generally, performing can include implementing, enacting, instantiating, executing, or otherwise performing the set of data analytics on the data block. The set of data analytics may include one or more techniques, operations, or algorithms configured to discover useful information, suggest inferences or conclusions, form deductions, model data, or derive conclusions. The set of data analytics may use computational statistics methods, natural language processing techniques, predictive analytic methods, and pattern recognition techniques to examine semantic and syntactic content of a data block to identify trends in data, generate models, formulate relationships, test hypotheses, and define rules. As examples, the set of data analytics may include stratified sampling, hypothesis testing, classification and regression (e.g., logistic and linear regression), decision tree learning, dimensionality reduction techniques (e.g., singular value decomposition, principal component analysis), feature extraction, and the like. In embodiments, performing the set of data analytics may include using a debug management engine to apply one or more data analysis techniques to ascertain a relationship between the data block and one or more debug criteria (e.g., whether or not the data block achieves a debug criterion). Other methods of performing data analytics on the data block are also possible.

At block 1050, the data block may be analyzed by a debug management engine with respect to the debug criterion. At block 1070, achievement of the debug criterion by the data block may be determined by the debug management engine. At block 1090, the breakpoint may be fired in response to determining the achievement of the debug criterion by the data block. Altogether, leveraging breakpoints with respect to debug management in a distributed batch data processing environment may be associated with bug identification, error resolution, debug efficiency, and application performance. The method 1000 may conclude at block 1099.

Figure 11:
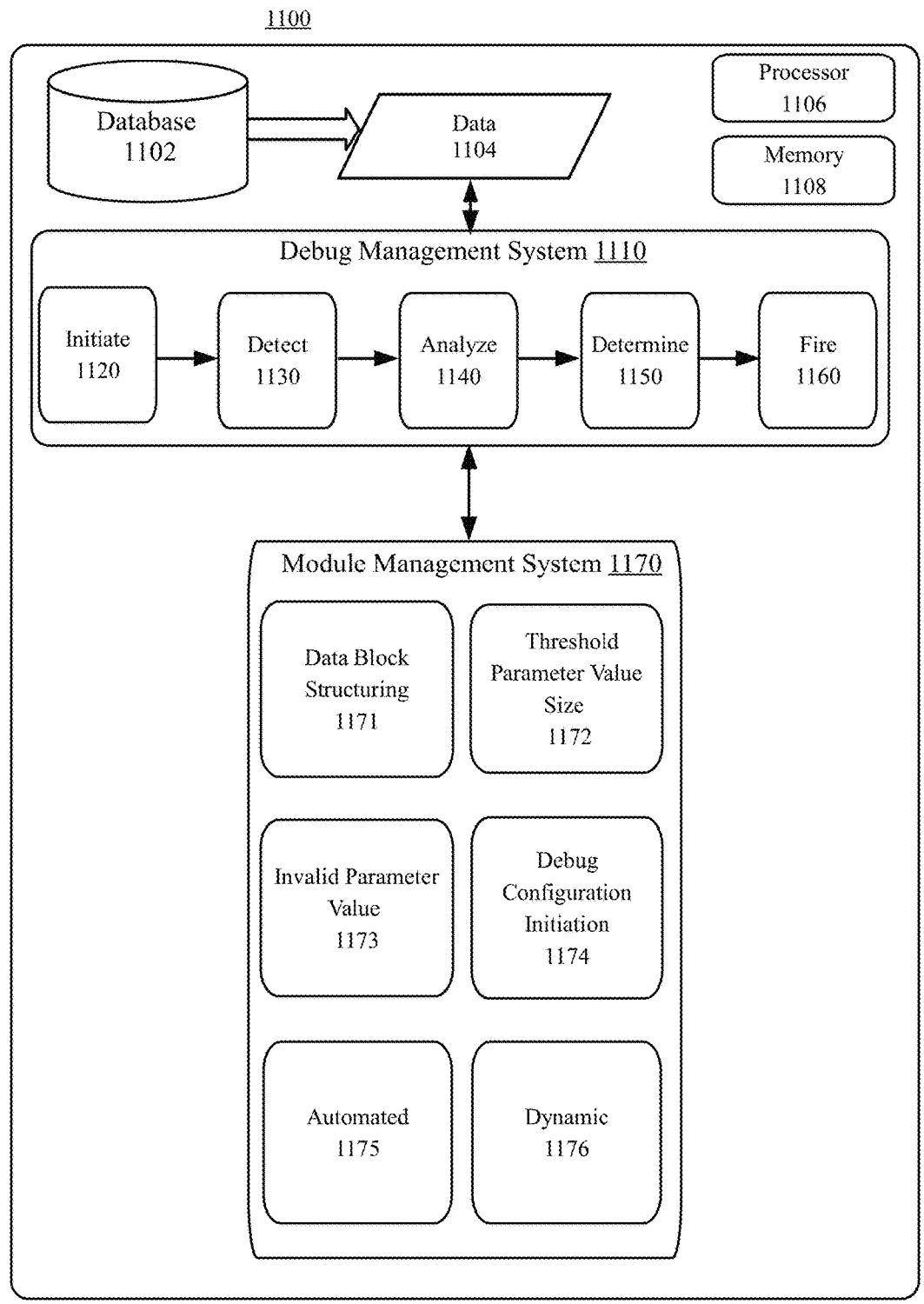
FIG. 11 shows an example system for debug management in a distributed batch data processing environment, according to embodiments.

FIG. 11 shows an example system 1100 for debug management in a distributed batch data processing environment, according to embodiments. The example system 1100 may include a processor 1106 and a memory 1108 to facilitate implementation of debug management. The example system 1100 may include a database 1102 configured to maintain data used for debug management. In embodiments, the example system 1100 may include a debug management system 1110. The debug management system 1110 may be communicatively connected to the database 1102, and be configured to receive data (e.g., tuples, data blocks) 1104 related to debug management. The debug management system 1110 may include an initiating module 1120 to initiate a debug configuration to fire a breakpoint based on an achievement of a debug criterion in the distributed batch data processing environment, a detecting module 1130 to detect a data block in the distributed batch data processing environment, an analyzing module 1140 to analyze the data block with respect to the debug criterion, a determining module 1150 to determine the achievement of the debug criterion by the data block, and a firing module 1160 to fire the breakpoint based on the achievement of the debug criterion. The debug management system 1110 may be communicatively connected with a module management system 1170 that includes one or more modules or sub-modules for implementing aspects of debug management.

In embodiments, a data block may be structured at module 1171. In embodiments, a stream of tuples may be ingested by the distributed batch data processing environment. Generally, ingesting can include receiving, importing, collecting, analyzing, transforming, processing, monitoring, or capturing the stream of tuples. In embodiments, ingesting may include importing the stream of tuples from a stream computing environment after completion of preliminary processing operations. For instance, in certain embodiments the stream computing environment may be configured to route the stream of tuples directly from an operator (e.g., sink operator) of the stream computing environment to an input interface of the distributed batch data processing environment. In embodiments, the stream of tuples may be batched to form the data block. Generally, batching can include grouping, sorting, packaging, arranging, organizing, or otherwise bundling the stream of tuples to form the data block. In embodiments, batching may include bundling tuples into groups of a fixed data size (e.g., 50 kilobytes, 1 megabyte). In embodiments, batching may include sorting the stream of tuples into one or more of a plurality of groups based on one or more sorting criteria (e.g., type of data, type of tuple, tuple attribute). For instance, tuples related to financial transactions may be sorted into a first group, and tuples related to video data may be sorted into a second group. In embodiments, in response to batching the stream of tuples, the data block may be assembled. Generally, assembling can include building, formulating, constructing, organizing, arranging, or otherwise structuring the data block in response to batching the stream of tuples. In embodiments, assembling can include formatting the batched group of tuples into a particular structure. As an example, the batched stream of tuples may be formatted to include a header (e.g., to include the block address, metadata about the data block), a directory (e.g., index about the contents of the data block), a block overhead, and a data payload (e.g., substantive content of the data block). Other methods of structuring the data block are also possible.

In embodiments, the debug criterion may be configured to include a particular parameter value size for a parameter which exceeds a threshold parameter value size for the parameter at module 1172. Generally, configuring can include programming, formulating, devising, arranging, setting, or establishing the debug criterion to include the particular parameter value size. The particular parameter value size may include an extent, degree, or magnitude of a value that exceeds (e.g., is greater than or equal to) the threshold parameter value size. The threshold parameter value size may include a predetermined range of valid or acceptable values sizes for the parameter. As examples, a parameter related to the months of the year may have a threshold parameter value size of 12 (e.g., the number of months in a calendar year), or a parameter related to financial transactions may have a threshold parameter value size of 100,000 dollars (e.g., transactions having sums larger than 100,000 dollars are not anticipated by the distributed batch data processing environment). Accordingly, the particular parameter value size may include a value having a magnitude that exceeds the threshold parameter value size. For instance, for a parameter related to interest rates having a threshold parameter value size of 8% (e.g., interest rates greater than 8% are not expected by the distributed batch data processing environment), a particular parameter value size of 11% may exceed the threshold parameter value size. In this way, data blocks including particular parameter value sizes that exceed threshold parameter value sizes may trigger firing of a breakpoint. Other methods of configuring the debug criterion to include a particular parameter value size for a parameter which exceeds a threshold parameter value size are also possible.

In embodiments, the debug criterion may be configured to include an invalid parameter value for a parameter at module 1173. Generally, configuring can include programming, formulating, devising, arranging, setting, or establishing the debug criterion to include the invalid parameter value for the parameter. The invalid parameter value may include a value having a type, characteristic, attribute, or other quality that is not recognized, interpretable, or able to be processed by a compute node of the distributed batch data processing environment. For instance, for a parameter related to currency values, a parameter value including an alphabetical character (e.g., "D") may be considered to be an invalid parameter value. As other examples, a portion of programming code having incorrect syntax, an uninitialized variable, or invoking a code library that is not available may also be considered to be invalid parameter values. Consider the following example. A particular compute node of the distributed batch data processing environment may be configured to perform natural language processing techniques on data blocks having English-language text. In certain embodiments, a data block may be received and analyzed by the particular compute node, and it may be ascertained that the data block contains one or more non-English language characters (e.g., α, あ, 知). Accordingly, the non-English language characters may be identified as invalid parameter values, and a breakpoint may be triggered with respect to the data block. Other methods of configuring the debug criterion to include an invalid parameter value for a parameter are also possible.

In embodiments, the debug configuration in the distributed batch data processing environment may be initiated at module 1174 (e.g., in response to sensing an error event). Generally, initiating can include starting, introducing, launching, instantiating, commencing, or otherwise beginning the debug configuration in response to sensing (e.g., detecting, discovering, recognizing, ascertaining, determining) the error event. The error event may include a bug, glitch, error, failure, or other type of irregularity. For instance, the error event may include a data block having a parameter that exceeds a threshold parameter value size or an invalid parameter value. In response to sensing the error event, the debug configuration may be initiated to manage the error event with respect to the data block (e.g., using a breakpoint response action). Consider the following example. A data block may be received by a distributed batch data processing environment (e.g., from a stream computing environment), and be transmitted to a compute node for processing. The compute node may analyze the data block and ascertain that one or more aspects of the data block contain corrupted data. As such, the compute node may submit a notification of the corrupted data to a debug management engine. In response to receiving the notification indicating the error event of corrupted data, the debug configuration may be initiated in the distributed batch data processing environment to facilitate debugging of the data block. Other methods of initiating the debug configuration in response to sensing the error event are also possible.

In embodiments, the initiating, the detecting, the analyzing, the determining, the firing and other steps described herein may each occur in an automated fashion at module 1175. In embodiments, the initiating, the detecting, the analyzing, the determining, the firing, and other steps described herein may be carried out by an internal debug management module maintained in a persistent storage device of a distributed batch data processing environment host node or locally connected hardware device. In embodiments, the initiating, the detecting, the analyzing, the determining, the firing, and other steps described herein may be carried out by an external debug management module hosted by a remote computing device or server (e.g., accessible via a subscription, usage-based system, or other service model). In this way, aspects of debug management may be performed using automated computing machinery without user intervention or manual action. Other methods of performing the steps described herein are also possible.

In embodiments, the initiating, the detecting, the analyzing, the determining, the firing, and other steps described herein may each occur in an dynamic fashion to streamline debug management at module 1176. For instance, the initiating, the detecting, the analyzing, the determining, the firing, and other steps described herein may occur in real-time, ongoing, or on-the-fly. As an example, one or more steps described herein may be performed in an ongoing fashion (e.g., multiple data blocks may be simultaneously processed and managed in parallel by different compute nodes in the distributed batch data processing environment) in order to streamline (e.g., facilitate, promote, enhance) debug management in the distributed batch data processing environment. Other methods of performing the steps described herein are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for debug management in a distributed batch data processing environment which uses a shared pool of configurable computing resources, the method comprising:
    initiating, in the distributed batch data processing environment, a debug configuration to fire a breakpoint based on an achievement of a debug criterion;
    detecting, in the distributed batch data processing environment, a data block;
    analyzing, by a debug management engine, the data block with respect to the debug criterion;
    determining, by the debug management engine, the achievement of the debug criterion by the data block;
    firing, in response to determining the achievement of the debug criterion by the data block, the breakpoint based on the achievement of the debug criterion; and
    firing the breakpoint with respect to a plurality of data block partitions.

2. The method of claim 1, wherein the distributed batch data processing environment includes an Apache Spark environment.

3. The method of claim 1, wherein the data block includes a Resilient Distributed Dataset (RDD).

4. The method of claim 1, wherein the data block includes a partition of a Resilient Distributed Dataset (RDD).

5. The method of claim 1, further comprising:
    carrying-out, in a simultaneous fashion, one or more breakpoint response actions with respect to the plurality of data block partitions.

6. The method of claim 1, further comprising:
    carrying-out, in a temporally-disparate fashion, one or more breakpoint response actions with respect to the plurality of data block partitions.

7. The method of claim 1, further comprising:
    ingesting, by the distributed batch data processing environment, a stream of tuples;
    batching, to form the data block, the stream of tuples; and
    assembling, in response to batching the stream of tuples, the data block.

8. The method of claim 7, further comprising:
    receiving, by a stream computing environment, the stream of tuples to be processed by a set of processing elements which operate on a set of hosts of the shared pool of configurable computing resources; and
    processing, using the set of processing elements which operate on the set of hosts, the stream of tuples.

9. The method of claim 8, further comprising:
    ingesting the stream of tuples by the distributed batch data processing environment in response to both receiving and processing the stream of tuples by the stream computing environment.

10. The method of claim 1, further comprising:
    performing, in advance of firing the breakpoint, a set of data analytics on the data block.

11. The method of claim 1, further comprising:
    configuring the debug criterion to include a particular parameter value size for a parameter which exceeds a threshold parameter value size for the parameter.

12. The method of claim 1, further comprising:
    configuring the debug criterion to include an invalid parameter value for a parameter.

13. The method of claim 1, further comprising:
    examining, to analyze the data block with respect to the debug criterion, a set of metadata of the data block; and
    identifying, by comparing the debug criterion with the set of metadata of the data block, a match to determine the achievement of the debug criterion by the data block.

14. The method of claim 1, further comprising:
    initiating the debug configuration in the distributed batch data processing environment in response to sensing an error event.

15. The method of claim 1, wherein the initiating, the detecting, the analyzing, the determining, and the firing each occur in a dynamic fashion to streamline debug management.

16. The method of claim 1, wherein the initiating, the detecting, the analyzing, the determining, and the firing each occur in an automated fashion without user intervention.

17. A system for debug management in a distributed batch data processing environment which uses a shared pool of configurable computing resources, the system comprising:
    a memory having a set of computer readable computer instructions, and
    a processor for executing the set of computer readable instructions, the set of computer readable instructions including:
    initiating, in the distributed batch data processing environment, a debug configuration to fire a breakpoint based on an achievement of a debug criterion;
    detecting, in the distributed batch data processing environment, a data block;
    analyzing, by a debug management engine, the data block with respect to the debug criterion;
    determining, by the debug management engine, the achievement of the debug criterion by the data block;
    firing, in response to determining the achievement of the debug criterion by the data block, the breakpoint based on the achievement of the debug criterion; and
    firing the breakpoint with respect to a plurality of data block partitions.

18. A computer program product for debug management in a distributed batch data processing environment which uses a shared pool of configurable computing resources, the computer program product comprising a non-transitory computer readable storage medium having program instructions embodied therewith, the program instructions executable by a processor to cause the processor to perform a method comprising:
    initiating, in the distributed batch data processing environment, a debug configuration to fire a breakpoint based on an achievement of a debug criterion;
    detecting, in the distributed batch data processing environment, a data block;
    analyzing, by a debug management engine, the data block with respect to the debug criterion;
    determining, by the debug management engine, the achievement of the debug criterion by the data block;
    firing, in response to determining the achievement of the debug criterion by the data block, the breakpoint based on the achievement of the debug criterion; and firing the breakpoint with respect to a plurality of data block partitions.

19. The computer program product of claim 18, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *